US008019588B1

(12) United States Patent  
Wohlberg et al.

(10) Patent No.: US 8,019,588 B1  
(45) Date of Patent: Sep. 13, 2011

(54) METHODS AND SYSTEMS TO COMPARE SCREEN CAPTURES FROM EMULATED DEVICES UNDER TEST

(75) Inventors: Tim Wohlberg, Hamburg (DE); Klaas Stöeckmann, Hamburg (DE); Soeren Ammedick, Neumuenster (DE); Kai Ortmanns, Stelle (DE)

(73) Assignee: Adobe Systems Incorporated, San Jose, CA (US)

( * ) Notice: Subject to any disclaimer, the term of this patent is extended or adjusted under 35 U.S.C. 154(b) by 621 days.

(21) Appl. No.: 12/127,217

(22) Filed: May 27, 2008

(51) Int. Cl.  
*G06F 9/45* (2006.01)

(52) U.S. Cl. .......................... 703/22; 717/134

(58) Field of Classification Search .................. 717/124, 717/134; 703/22  
See application file for complete search history.

(56) References Cited

U.S. PATENT DOCUMENTS

2006/0100021 A1* 5/2006 Yoshino et al. ................. 463/45  
2006/0277209 A1* 12/2006 Kral et al. ..................... 707/102

* cited by examiner

*Primary Examiner* — Dwin M Craig  
(74) *Attorney, Agent, or Firm* — Kilpatrick Townsend & Stockton LLP

(57) ABSTRACT

Systems and methods for reviewing test results are disclosed. In one embodiment, the method includes receiving a first display capture from a testing of a first emulated device executing an application, wherein the first display capture is from a first instance in the application. The method further includes receiving a second display capture from a testing of a second emulated device executing the application, wherein the second display capture is from the first instance in the application. The method also includes creating a display capture package comprising the first display capture and the second display capture. The display capture package is configured to cause the simultaneous display of the first display capture and the second display capture. The method further includes transmitting the display capture package to a display device.

30 Claims, 8 Drawing Sheets

METHODS AND SYSTEMS TO COMPARE SCREEN CAPTURES FROM EMULATED DEVICES UNDER TEST

FIELD OF THE DISCLOSURE

Embodiments of the disclosure relate generally to the field of data processing systems. For example, embodiments of the disclosure relate to systems and methods for reviewing test results.

BACKGROUND

Various types of computing devices exist today. For example, various mobile devices exist, from different mobile phones to personal digital assistants (PDAs) to portable computers. With the variety of devices that may operate under numerous different environments, applications to be executed on a computing device are now developed for multiple types of devices. For example, an application may be developed to execute within a specific runtime environment operating on a computing device, wherein the operating environment may be executed on various types of devices.

As a result of the variety of device architectures and operating environments, an application may execute differently on different devices. Hence, an application may be tested on an emulated device to ensure that the application executes properly on the device. When testing an application, a developer may take a display capture of the emulated device. Therefore, when reviewing the test results for an application, the developer may review the display capture to determine if there are any inconsistencies or problems with the application.

Since the application is to be consistent across the devices, the application must be tested for each device. A display capture may be used to review testing of the application on a device-by-device basis. One problem is that the developer may not be able to accurately compare the display captures from different devices in order to compare the test results for all of the emulated devices executing the application.

SUMMARY

Systems and methods for reviewing test results are disclosed. In one embodiment, the method includes receiving a first display capture from a testing of a first emulated mobile device executing an application, wherein the first display capture is from a first instance in the application. The method further includes receiving a second display capture from a testing of a second emulated mobile device executing the application, wherein the second display capture is from the first instance in the application. The method also includes creating a display capture package comprising the first display capture and the second display capture. The display capture package is configured to cause the simultaneous display of the first display capture and the second display capture. The method further includes transmitting the display capture package to a display device. In another embodiment, a computer-readable medium (such as, for example, random access memory or a computer disk) includes code for carrying such a method.

These illustrative embodiments are mentioned not to limit or define the disclosure, but to provide examples to aid understanding thereof. Illustrative embodiments are discussed in the Detailed Description, and further description of the disclosure is provided there. Advantages offered by various embodiments of this disclosure may be further understood by examining this specification.

BRIEF DESCRIPTION OF THE DRAWINGS

These and other features, aspects, and advantages of the present disclosure are better understood when the following Detailed Description is read with reference to the accompanying drawings, wherein.

DETAILED DESCRIPTION OF EMBODIMENTS

Figure 1:
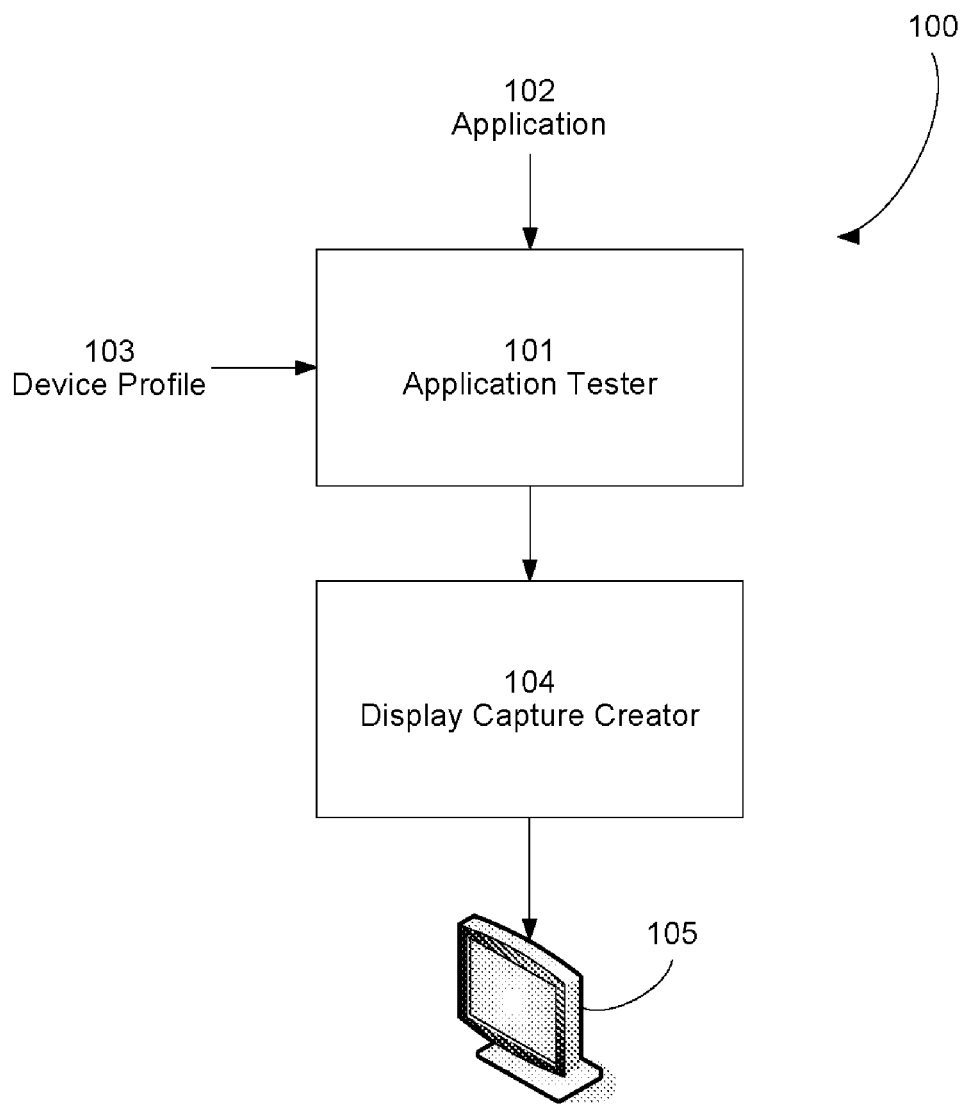
FIG. 1 shows an exemplary system for automatically creating display capture packages for display.

Embodiments of the disclosure relate generally to the field of data processing systems. For example, embodiments of the disclosure relate to systems and methods for reviewing test results. Throughout the description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

Computing devices, such as mobile devices (including mobile phone, PDAs, and portable computers), may be emulated so that the physical devices are not needed for testing. An application tester may include an emulator so that an application may be tested on an emulated device. In order to emulate a device, an emulator loads an emulation script that when executed emulates the computing device. When a different device is to be emulated, the emulator loads a different emulation script.

The emulator may create the script for a device from a device profile. A device profile may contain the characteristics of a computing device stored in one location, such as a file. For example, a device profile may include the hardware and firmware capabilities of a device, such as the device's allowable display resolutions, display color depth, processor type, and memory size. The device profile may further include settings or operating conditions of the device, such as how much memory and cache are being consumed and other processes that may be executing on the device, time setting on the device, and date setting on the device.

An application may be tested on a device emulated from a device profile. To test the application, a user interacts with the emulated device as if the emulated device is the physical device. A test script also may be used by an application tester to automatically test the application on any emulated device.

In one embodiment, during testing of an application, the display of the emulated device may be captured at a predetermined display update of the application. For example, after the display for an application updates forty times, the application tester may be instructed to take a display capture of the emulated device. In addition, the display of a second emulated device also may be captured at the predetermined display update of the application.

The display captures are then packaged and sent to a display so that a user may simultaneously view the two device captures. For example, the two display captures after the fortieth display update may be displayed in one window. By viewing the two display captures at the same time, the user may determine if the application is operating consistently on the emulated devices. To determine consistency, the user may determine if the display captures are sufficiently the same between the emulated devices at the same application instance (e.g., the same display update for each emulated device).

Application Testing for Mobile Devices

An application may be any code that is executed on a device. In one embodiment, the application may be code that is executed within a runtime environment on the computing device. Example applications include, but are not limited to, programs (e.g., games, word processing, and calendar), multimedia files (e.g., movies and music), wallpapers, screensavers, and miscellaneous scripts.

An application may be tested in order to find anomalies in the application, such as freezing or display artifacts. The application also may be tested on multiple devices to ensure the application presents the same user experience independent of the device or device profile used to execute the application.

Testing may be performed using a test script so that less user interaction is required. For example, a test script automatically may test an application on an emulated device under a predetermined operating environment. The test script may include instructions that are executed for the application. The test script may also include a snapshot tool instruction in order to capture the display image of the emulated device executing the application. The snapshot tool of an application tester 101 thus may be used to create a snapshot in order for a user to visually inspect test results after automated testing is performed. In one embodiment, when instructions or snapshots are to be executed is dependent on the number of display updates that have occurred for the emulated device executing the application.

Display refresh rates for a device may vary between devices and between different device profiles. For example, a device with a higher processor usage from its load or slower processing capability than another device may have a slower display refresh rate. In one embodiment, a display refresh occurs for an application 102 when the application is to change the display of the device. For example, when a character in a game is to move around the device display, the device refreshes the device display in order to display the character moving. Hence, the character is in a first position on the display after a first display refresh. Then, the character is in a second position on the display after a second display refresh. In another embodiment, a display refresh may occur at a periodic interval irrespective of what is shown on the device display. For example, a display refresh may occur based on a frame rate established for a media player. A display update may be a display refresh that produces a different image than displayed before the display refresh. In one embodiment, the application tester 101 counts the number of display updates that occur. Therefore, the counted number of display updates accumulate when changes are made on the display.

In order to synchronize an application for various devices during automatic testing, the application displays the same information at the same application instance independent of the device executing the application. One type of instance in an application is the application displayed after the same number of display updates by the emulated device. For example, if a character of a game is in a first position after a first display update on a first device display, the character should be in the first position after a first display update on a second device display. Therefore, display captures from the snapshot tool are reviewed to ensure synchronization between the various devices executing the application.

Other types of application instances may include, but are not limited to, amount of time application is executing, amount of device memory application has consumed during execution, and instruction line number of the application of the instruction being executed by the emulated device.

Automatic Packaging of Display Captures

FIG. 1 shows an exemplary system 100 for automatically creating display capture packages for display 105. In one embodiment, the system 100 comprises an application tester 101 to test application 102 using a device emulated from device profile 103. In one embodiment, testing of the application 102 is by a user interacting with the emulated device. In another embodiment, testing of the application 102 is performed by executing a test script. The application tester 101 may receive a plurality of device profiles 103. Therefore, the application tester 101 may emulate a plurality of devices. Since the application tester 101 may emulate a plurality of devices, the application tester 101 may test an application on each of the plurality of emulated devices.

In one embodiment, the application tester 101 is a program executing in a runtime environment of a computing device. For example, the application tester 101 may be an executable that operates within a runtime environment on a desktop computer. The application tester 101 may include an emulator. Thus, the application tester 101 may receive various device profiles in order to emulate a device under a predetermined operating environment.

Figure 2:
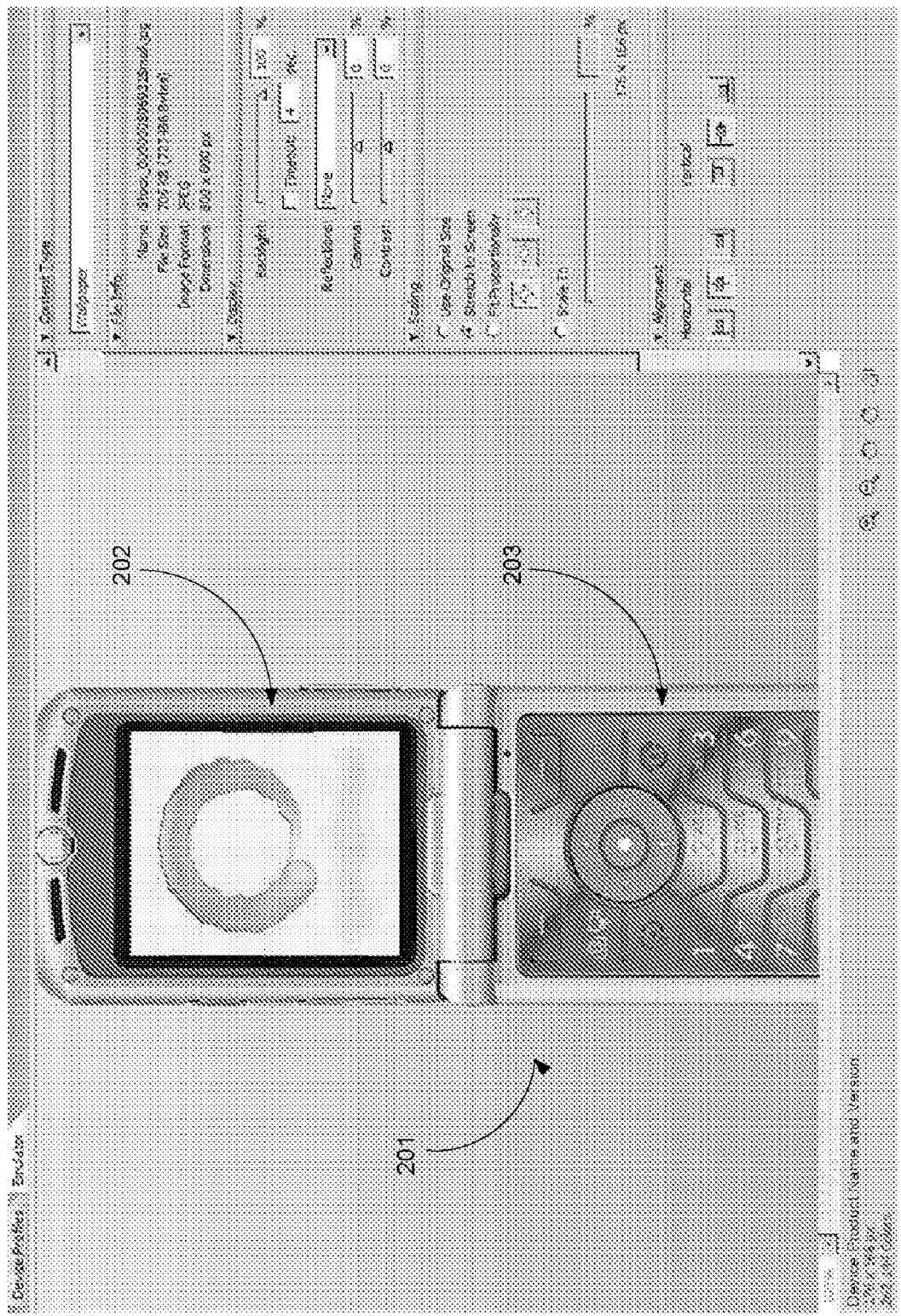
FIG. 2 illustrates a display capture of an application being executed on an emulated device for an application tester.

FIG. 2 illustrates a display capture 200 of an application 202 being executed on an emulated device 201 for an application tester 101. In one embodiment, an interactive image of the emulated device 201 is shown to the user of the application tester 101. The application 202 is viewed on the display of the emulated device 201.

In testing the application 202, inputs may be received from the user via interaction with the controls 203 of the emulated device 201. In the present example, the controls are the illustrated buttons of the emulated device. For example, if the user wishes to press the number 2 button on the emulated device 201, the user may click on the corresponding visual button of the emulated device 201. In one embodiment, hot keys may be set up so that the user may use a keyboard to select a user control 203.

Therefore, a user tests the application 202 by interacting with the emulated device 201 through the user controls 203. In one embodiment, the user may pause and continue testing of the application at any time during testing. The application tester 101 may further include a snapshot tool button or other control in the interface (not shown). When the user enacts the snapshot tool, the application tool 101 records a snapshot or display capture of the emulated device display at that instance. The display capture may then be retrieved at a later time for inspection by the user.

A test script may also be executed by the application tester 101 in order to simulate a user testing the emulated device 201 executing the application. For example, the test script may include a group of instructions wherein each instruction simulates a user interaction with the emulated device. Additional instructions may exist in the test script to enact the snapshot tool of the application tester 101. In one embodiment, each instruction is associated with an instance in the application where the instruction is to be executed. Hence, the test script alerts the application tester 101 as to when a user control 203 is to be executed or the snapshot tool is to be engaged in relation to the number of display updates occurred or other types of application instances.

Figure 3:
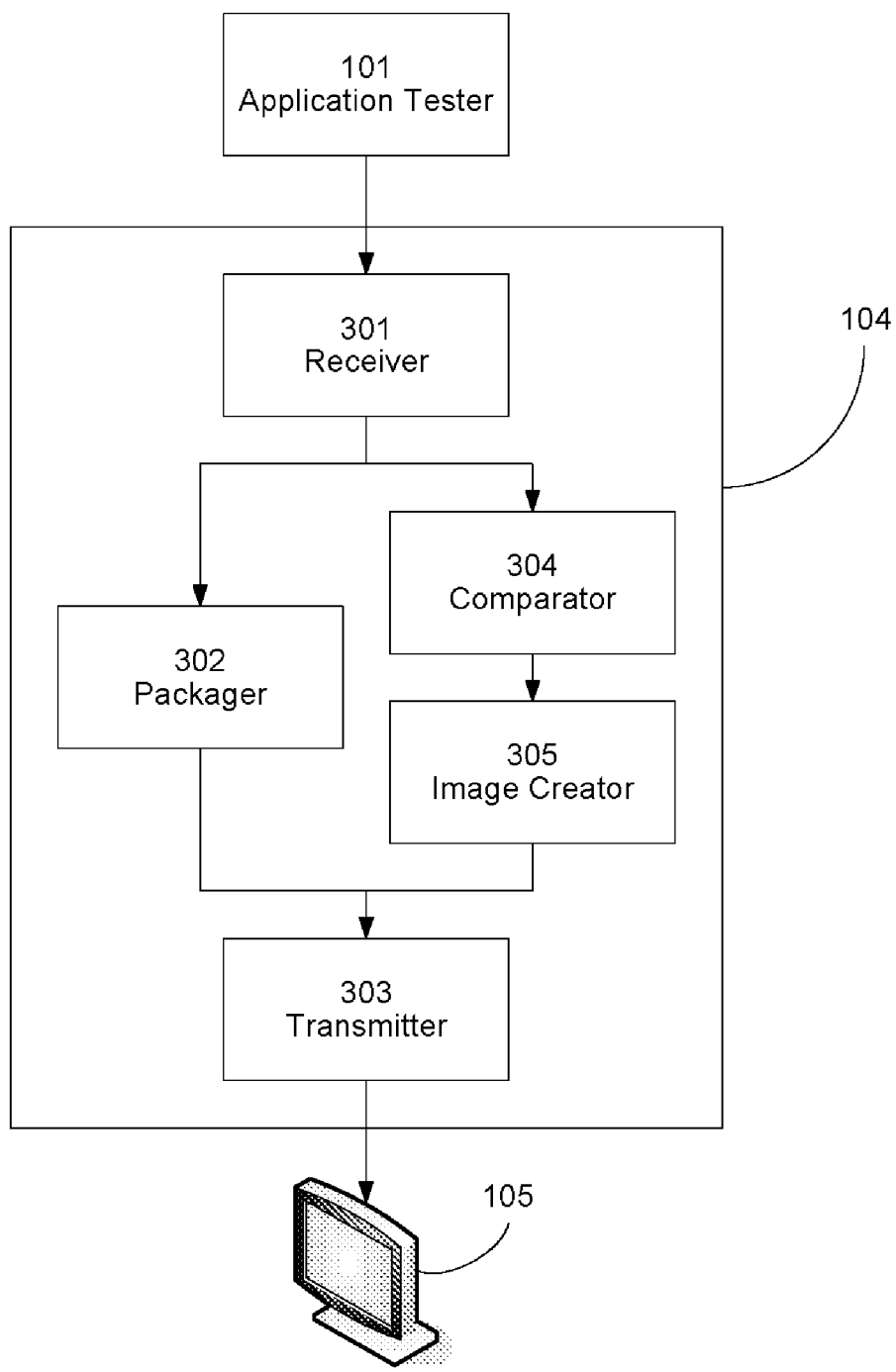
FIG. 3 shows an exemplary display capture creator of the exemplary system in FIG. 1.

In one embodiment, the display captures of the executing application 202 on each emulated device 201 are sent to the display capture creator 104. FIG. 3 shows an exemplary display capture creator 104 of the exemplary system 100 in FIG. 1. The display capture creator 104 may comprise a receiver 301 to receive the display captures from the application tester 101. The display capture creator may further comprise a packager 302. As previously stated, to determine if an application is synchronized for various devices, a user may review the display captures of various emulated devices from the same instance in the application. Therefore, the packager 302 may be configured to package together the received display captures in order to be sent to a display so that multiple display captures may be viewed simultaneous. The display capture creator 104 may further comprise a transmitter 303 for sending the display capture packages created by the packager 302 to display 105.

Figure 4:
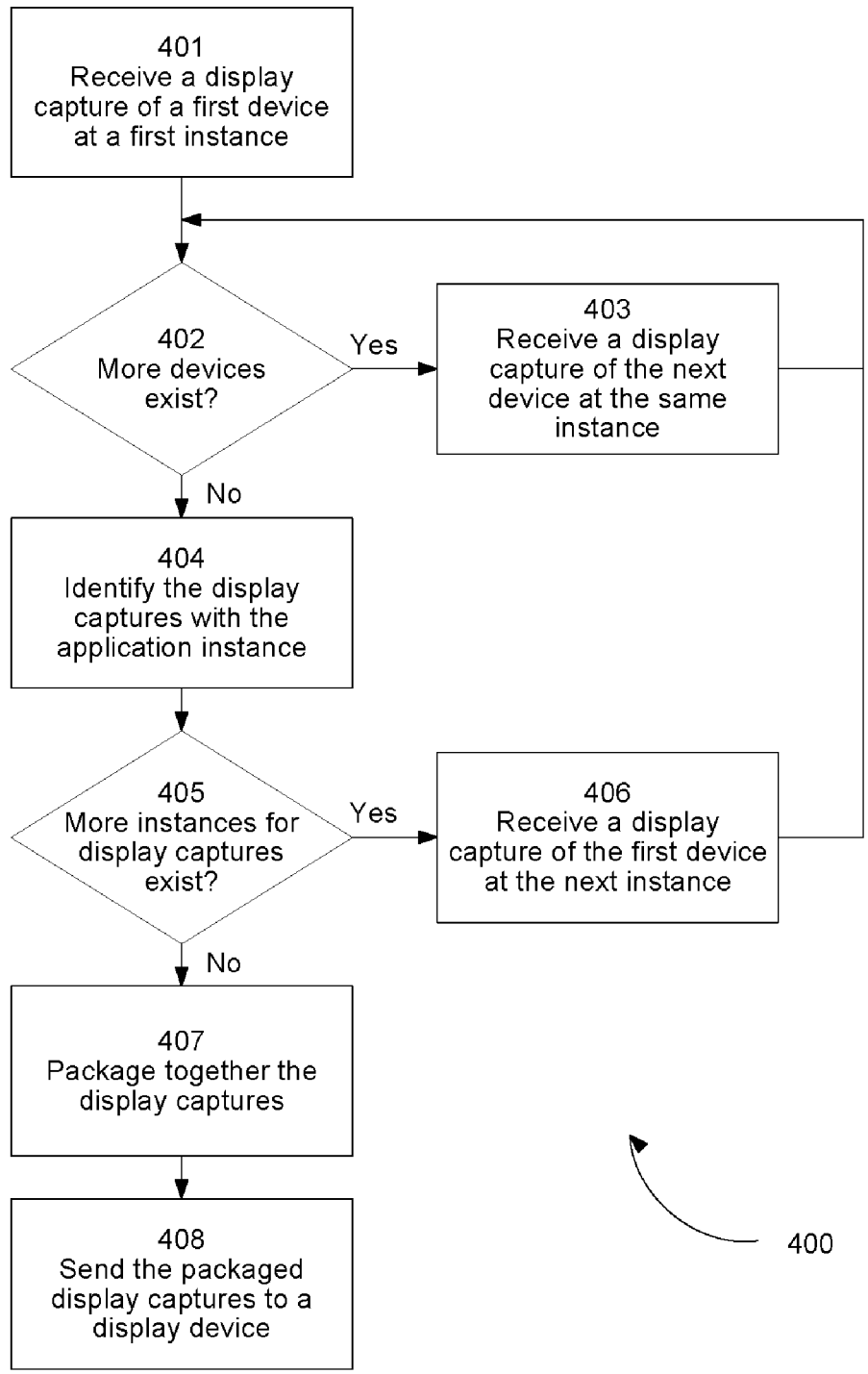
FIG. 4 illustrates an exemplary method for packaging and sending display captures by the display capture creator in FIG. 3.

FIG. 4 illustrates an exemplary method 400 for packaging and sending display captures by the display capture creator 104 in FIG. 3. Beginning at 401, the receiver 301 receives a display capture from a first emulated device at a first instance and passes it to the packager 302. For example, the receiver 301 may receive a display capture from an emulated cell phone taken after the sixtieth display update for the emulated device executing the application.

Proceeding to 402, the display capture creator 104 determines if display captures from other emulated devices at the first instance are to be received. If more display captures are to be received, then the receiver 301 receives a display capture of the next device at the first instance in 403. For example, if the application tester 101 is automatically testing twenty emulated devices executing the application, then the device capture creator 104 may receive twenty device captures at the first instance in the application.

If no more display captures at the first instance of the application are to be received (i.e., display captures at the first instance have been received from all emulated devices), then process flows to 404. In 404, the packager 302 identifies the received display captures with the instance in the application that the display captures were taken. For example, if a display capture was created after the tenth display update for an application, the display capture is associated with an identifier associating the display capture with the tenth display update of the application. In one embodiment, the packager 302 receives the instance information (e.g., display update) with each display capture received.

Proceeding to 405, the display capture creator 104 determines if display captures are to be received for other instances. For example, once the display capture creator 104 has received all of the display captures for a first display update of emulated devices executing the application, the display capture creator 104 may determine if display captures exist for the second display update of emulated devices executing the application. In one embodiment, the application tester may notify the display capture creator that more display captures exist. For example, the display capture creator 104 may associate a first identifier identifying a first and second display capture as from the first instance in the application and may associate a second identifier identifying a third and fourth display capture as from the second instance in the application being tested. In another embodiment, the display capture creator 104 may actively query the application tester 101 for a display capture for each instance. In another embodiment, the display captures are received during testing of the emulated devices executing the application. Therefore, upon completion of testing, the application tester 101 may notify the display capture creator that no more display captures exist.

If more display captures are to be received for other instances in 405, then the receiver 301 receives the next display capture at the next instance in the application of the first device in 406. The process then reverts to 402. The display capture creator 104 reiterates 402 through 406 until all display captures are received. Upon all display captures being received and identified with their respective instance in the application, the device capture creator 104 determines in 405 that no more display captures are to be received.

Proceeding to 407, the packager 302 may package together all of the display captures into a display capture package. For example, the packager 302 may create one file including all of the display captures. The file further may include a formatting script so that a transmitter 303 may send the display captures as one window to be displayed on the display 105. Proceeding to 408, the transmitter 303 receives the display capture package and sends the package to the display 105. Therefore, a user may be able to view a plurality of display captures at one time in order to review any differences between the display captures from the same application instance.

In another embodiment, the packager 302 may package a portion of the received display captures. For example, the packager 302 may package the display captures for a specific application instance so that a user may review the display captures for the single application instance. In another embodiment, the transmitter 303 may send the display capture package to other devices, including but not limited to, clients, multiple displays, and a broadcast antenna in addition or alternative to sending the display capture package to display 105. Hence, a package created by the packager 302 may be viewed on devices other than display 105. Therefore, multiple users may be able to review the same display captured from the package.

Figure 5:
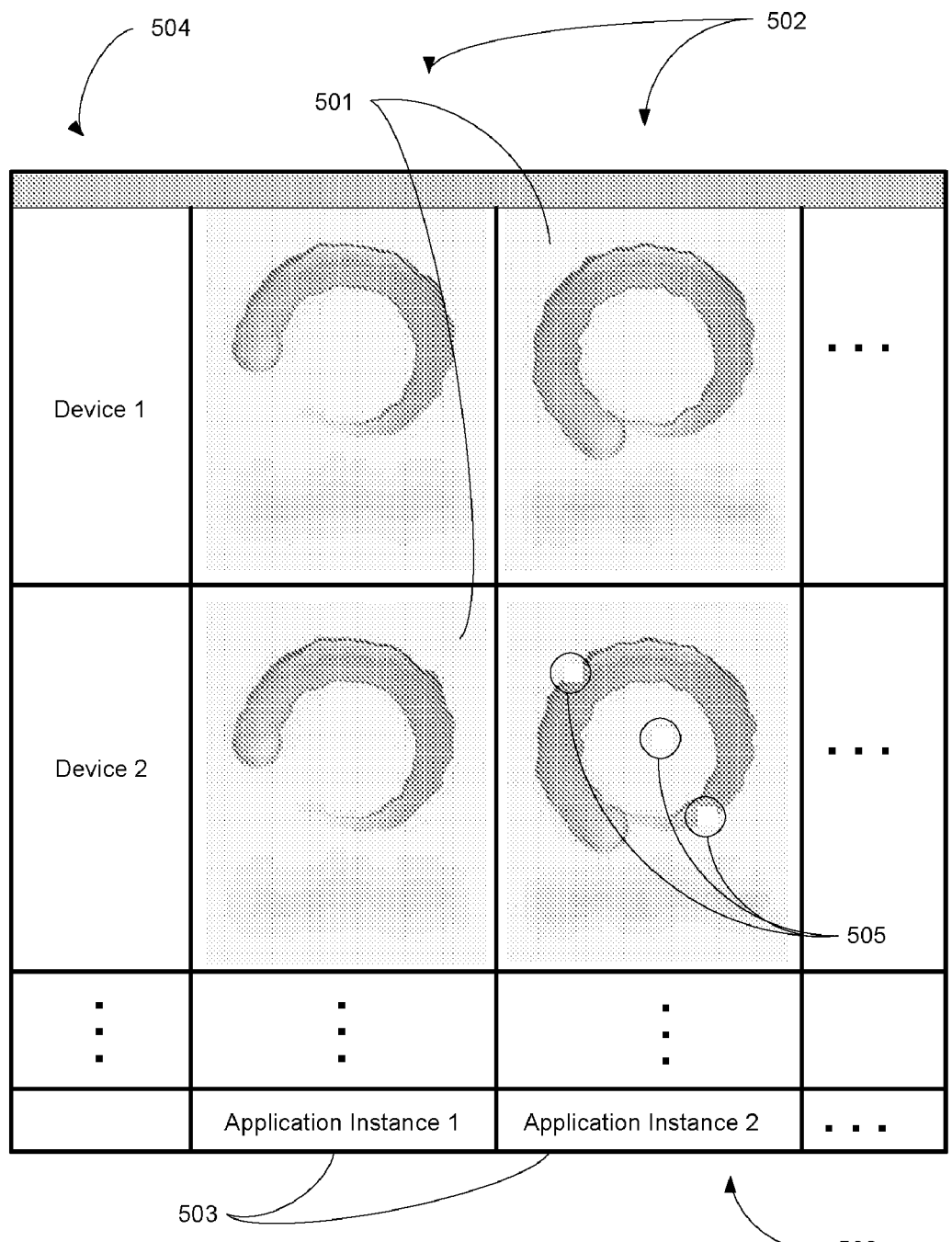
FIG. 5 illustrates an example display of the display captures packaged and sent by the display capture creator to the display in FIG. 3.

FIG. 5 illustrates an example display 500 of the display captures packaged and sent by the display capture creator 104 to the display 105. In one embodiment, the example display 500 is a window within a graphical user interface displayed to a user. The display 500 may include the display captures 501 together for the various emulated devices 504.

In one embodiment, the display captures 501 are organized into columns 502 for each instance identified with the display capture. Identifiers 503 may be used to identify the instance of the display capture. The display captures 501 also may be organized in rows for each emulated device 504. In the present example, the display capture of device 2 at application instance 2 illustrates differences 505 with the display capture of device 1 at application instance 2. For example, the display capture may illustrate artifacts or an incorrect display capture image. Therefore, a user reviewing the images may determine that a potential problem exist with the application executing on emulated device 2.

Referring back to FIG. 3, the display capture creator 104 further may be configured to create analysis information for the received display captures. The analysis information may then be used to assist a user in reviewing the display captures. For example, the display capture creator 104 may determine any differences between display captures from the same instance in an application and create an image from the determined differences. Therefore, a user may review the image of determined difference, and if the image is not blank, determine that an error may exist in the application.

Figure 6:
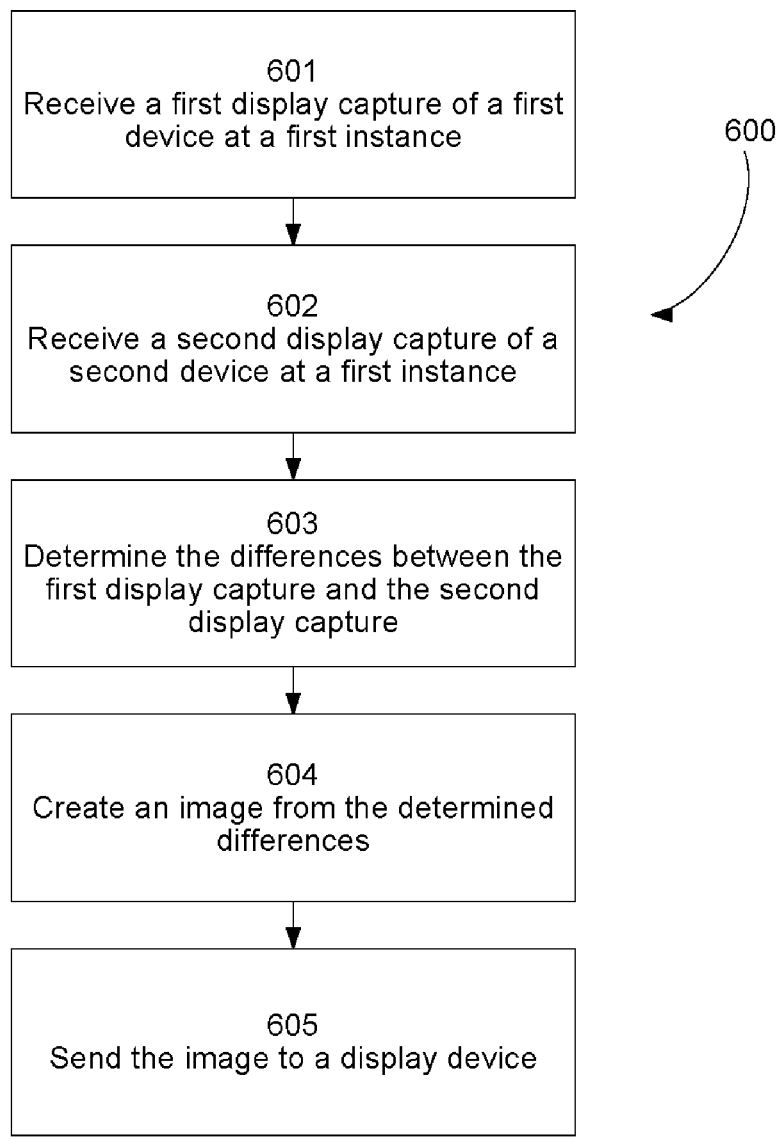
FIG. 6 illustrates an exemplary method to create and send to a display an image of differences between display captures by the display capture creator in FIG. 3.

In one embodiment, the display capture creator 104 comprises a comparator 304 configured to determine differences between display captures from the same application instance and an image creator 305 configured to create an image from the determined differences. FIG. 6 illustrates an exemplary method 600 to create and send to display 105 an image of differences between display captures by the display capture creator 104.

Beginning at 601, the receiver 301 receives a first display capture from a first device executing an at a first instance and forwards the first display capture to the comparator 304. Proceeding to 602, the receiver 301 receives a second display capture from a second device executing the application at the first instance and forwards the second display capture to the comparator 304. In one embodiment, the first and second display captures may be received by the display capture creator 104 for an application instance during execution of the method illustrated in FIG. 4. Hence, the display captures may be forwarded from the receiver 301 to both the packager 302 and the comparator 304.

Upon receiving the first and second display captures, the comparator 304 may determine the difference between the display captures in 603. In one embodiment, the comparator 304 may compare corresponding pixels between the two display captures for each pixel pair. Hence, the comparator 304 may determine difference between the display captures on a pixel basis. The display captures may be at different resolutions since the displays of the emulated devices may have different resolutions and color depths. Therefore, the comparator 304 may preprocess the display captures to force the two display captures to the same resolution before comparing. For example, a higher resolution display capture may be blurred in order to reduce the resolution of the display capture. In another embodiment, the comparator 304 may determine general differences between display captures instead of comparing the display captures pixel-by-pixel. For example, the comparator 304 may compare the total pixel values of a 3×3 mask between display captures to determine if the difference is above a predetermined threshold. When comparing the display captures, the comparator 304 may compare, for example, the grayscale values or the component values for the pixel color of a display capture (e.g., RGB).

Upon comparing the differences between two display captures, the comparator may have an array of values denoting the difference between corresponding pixels (or areas) of the display captures. Hence, the image creator 305 receives the differences determined by the comparator 304 and creates an image from the determined differences in 604. For example, for differences determined between two grayscale images, the image creator 305 may create a grayscale image from the difference in grayscale values. Proceeding to 605, the transmitter 303 receives the image of determined differences created by the image creator 305 and sends the image to display 105.

Figure 7:
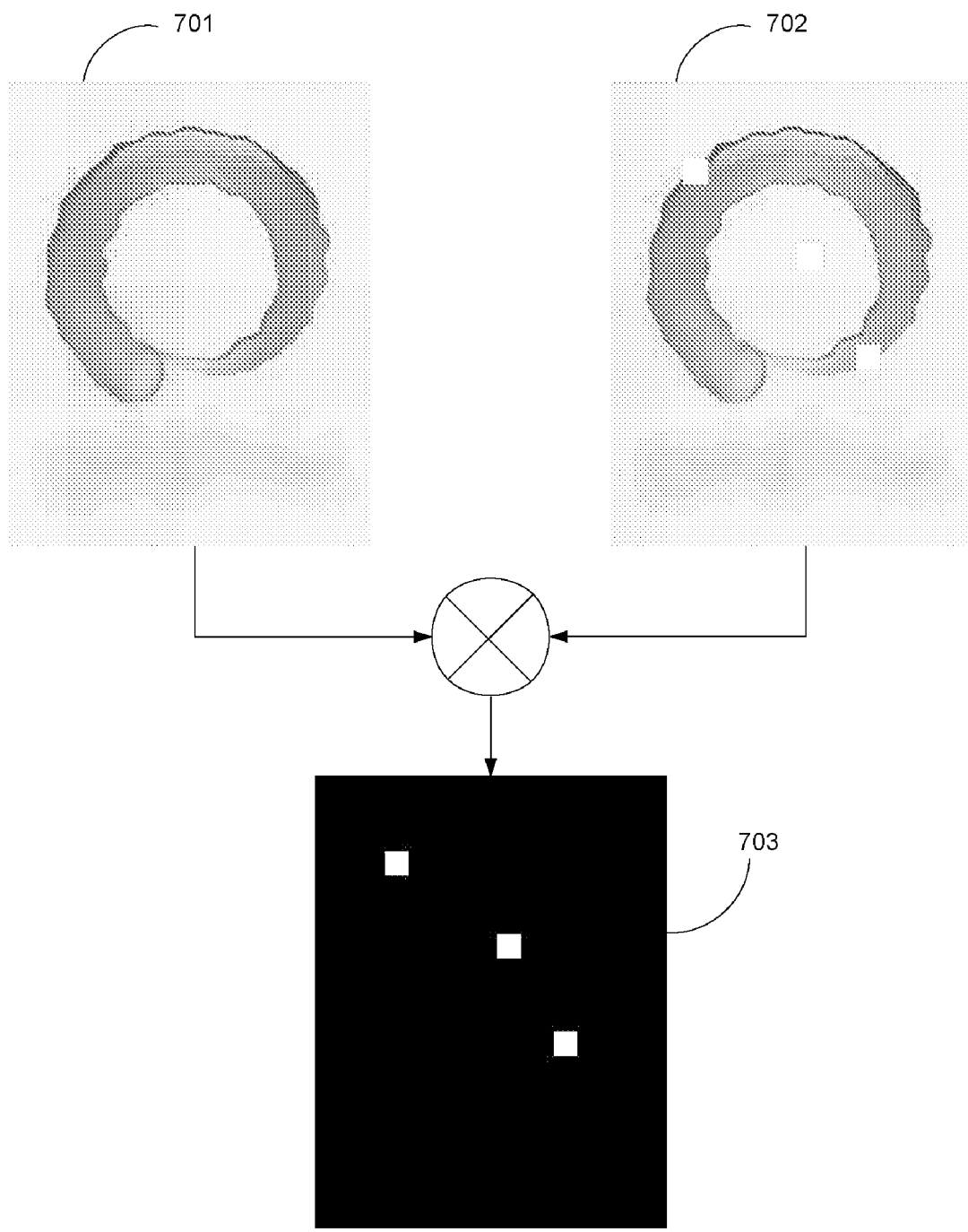
FIG. 7 illustrates an example image created from two example display captures by the display capture creator in FIG. 3 executing the method of FIG. 6.

FIG. 7 illustrates an example image 703 created from two example display captures 701 and 702 by the display capture creator 104 executing the method 600 of FIG. 6. In one embodiment, the display captures 701 and 702 from the same instance of an application are compared on a pixel-by-pixel basis. Therefore, the differences between the two images 701 and 702 are illustrated in image 703 for every pixel a difference exists. In one embodiment, the pixels of image 703 are thresholded to emphasize any major differences between the images 701 and 702. Therefore, a user may review the image 703 to see if differences exist between two display captures 701 and 702. In one embodiment, the image may be sent by the transmitter together with or separate from the display capture package to the display 105.

Exemplary Computer Architecture for
Implementation of Systems and Methods

Figure 8:
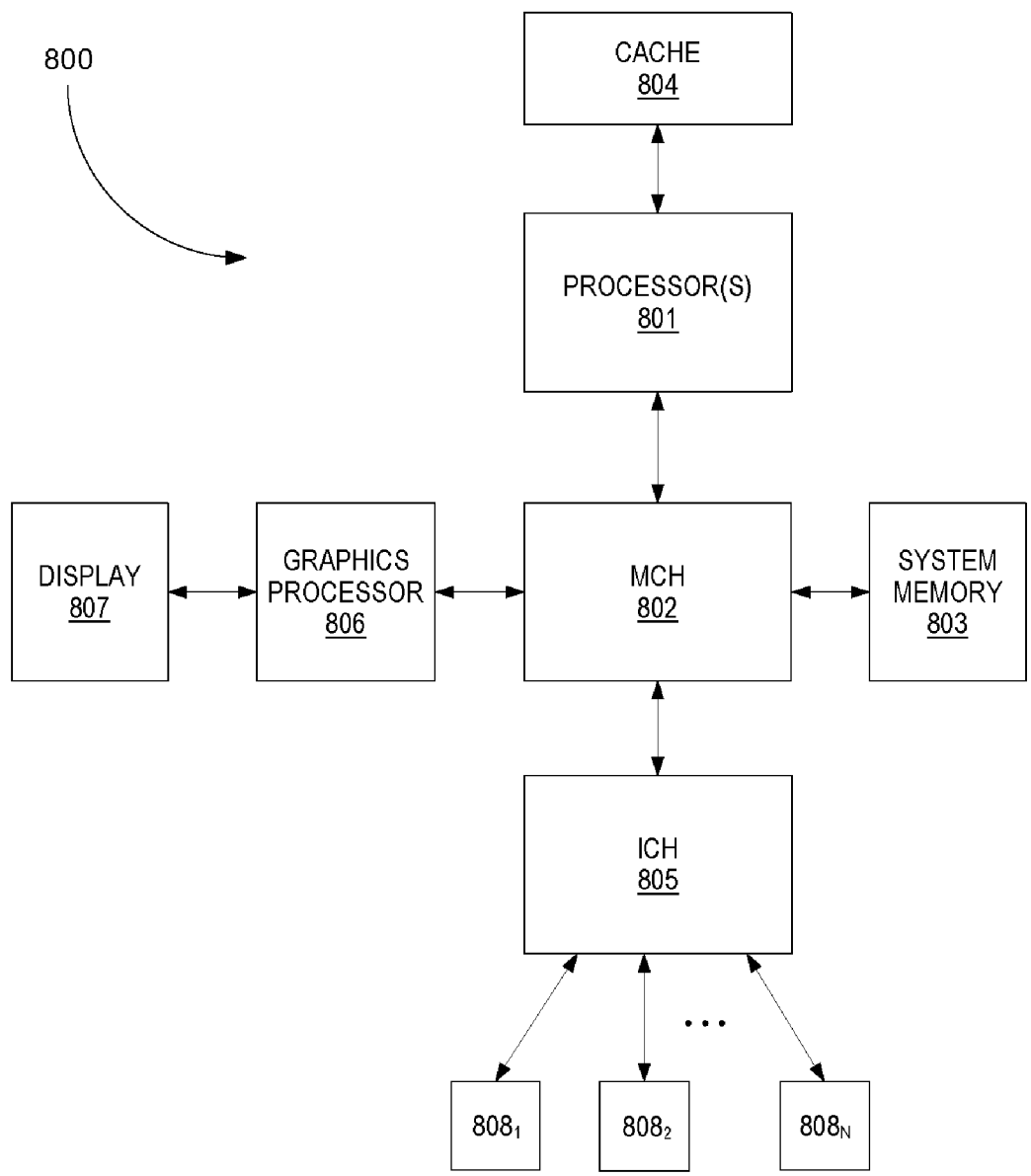
FIG. 8 illustrates an exemplary computer architecture for implementation of the example devices of FIGS. 1 and 3 and execution of the example methods of FIGS. 4 and 6.

FIG. 8 illustrates an example computer architecture 800 for implementing a the test module creation systems as described in FIGS. 1 and 3. The exemplary computing system of FIG. 8 includes: 1) one or more processors 801; 2) a memory control hub (MCH) 802; 3) a system memory 803 (of which different types exist such as DDR RAM, EDO RAM, etc,); 4) a cache 804; 5) an I/O control hub (ICH) 805; 6) a graphics processor 806; 6) a display/screen 806 (of which different types exist such as Cathode Ray Tube (CRT), Thin Film Transistor (TFT), Liquid Crystal Display (LCD), DPL, etc.); and/or 8) one or more I/O devices 808.

The one or more processors 801 execute instructions in order to perform whatever software routines the computing system implements. The instructions frequently involve some sort of operation performed upon data. Both data and instructions are stored in system memory 803 and cache 804. Cache 804 is typically designed to have shorter latency times than system memory 803. For example, cache 804 might be integrated onto the same silicon chip(s) as the processor(s) and/or constructed with faster SRAM cells while system memory 803 might be constructed with slower DRAM cells. By tending to store more frequently used instructions and data in the cache 804 as opposed to the system memory 803, the overall performance efficiency of the computing system improves.

System memory 803 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 803 prior to their being operated upon by the one or more processor(s) 801 in the implementation of a software program. Similarly, data that a software program determines should be sent from the computing system to an outside entity through one of the computing system interfaces, or stored into an internal storage element, is often temporarily queued in system memory 803 prior to its being transmitted or stored.

The ICH 805 is responsible for ensuring that such data is properly passed between the system memory 803 and its appropriate corresponding computing system interface (and internal storage device if the computing system is so designed). The MCH 802 is responsible for managing the various contending requests for system memory 803 access amongst the processor(s) 801, interfaces and internal storage elements that may proximately arise in time with respect to one another.

One or more I/O devices 808 are also implemented in a typical computing system. I/O devices generally are responsible for transferring data to and/or from the computing system (e.g., a networking adapter); or, for large scale non-volatile storage within the computing system (e.g., hard disk drive). ICH 805 has bi-directional point-to-point links between itself and the observed I/O devices 808.

Referring back to FIGS. 1 and 3, modules of the different embodiments of the described system may include software, hardware, firmware, or any combination thereof. The modules may be software programs executing within a runtime environment and available to the public or special or general purpose processors running proprietary or public software. The software may also be specialized programs written specifically for profile package creation and publishing. For example, storage of the system may include, but is not limited to, hardware (such as floppy diskettes, optical disks, CD-ROMs, and magneto-optical disks, ROMs, RAMs, EPROMs, EEPROMs, flash, magnetic or optical cards, propagation media or other type of media/machine-readable medium), software (such as instructions to require storage of information on a hardware storage unit, or any combination thereof.

In addition, elements of the present disclosure may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, flash, magnetic or optical cards, propagation media or other type of media/machine-readable medium suitable for storing electronic instructions.

For the exemplary methods illustrated in FIGS. 4 and 6, embodiments of the disclosure may include the various processes as set forth above. The processes may be embodied in machine-executable instructions which cause a general-purpose or special-purpose processor to perform certain processes. For example, a program executed in a runtime environment may perform certain processes. Alternatively, these processes may be performed by specific hardware components that contain hardwired logic for performing the processes, or by any combination of programmed computer components and custom hardware components.

Embodiments of the disclosure do not require all of the various processes presented, and it may be conceived by one skilled in the art as to how to practice the embodiments of the disclosure without specific processes presented or with extra processes not presented. For example, while it has been described of having a separate receiver and transmitter, the display capture creator may include a single transceiver to connect to the application tester and the display. In another example, the display capture creator may be a plug-in or portion of the application tester. In another example, while the flowchart in FIG. 6 is described in terms of comparing two display captures, more than two display captures from a single instance may be compared.

General

The foregoing description of the embodiments of the disclosure has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

What is claimed is:

1. A computer-implemented method, comprising:
   receiving a first display capture from a testing of a first emulated device executing an application, wherein the first display capture is from a first instance in the application;
   receiving a second display capture from a testing of a second emulated device executing the application, wherein the second display capture is from the first instance in the application;
   creating a display capture package comprising the first display capture, the second display capture, and a formatting script configured to cause a simultaneous display of the first display capture and the second display capture; and
   transmitting the display capture package to a display device.

2. The computer-implemented method of claim 1, wherein the first emulated device and the second emulated device are mobile devices.

3. The computer-implemented method of claim 1, further comprising:
   receiving a third display capture from the testing of the first emulated mobile device executing the application, wherein the third display capture is from a second instance in the application;
   receiving a fourth display capture from the testing of the second emulated mobile device executing the application, wherein the fourth display capture is from the second instance in the application; and
   packaging the third display capture and the fourth display capture into the display capture package,
   wherein the display capture package is further configured to cause a display of:
      the third display capture and the fourth display capture simultaneously with the first display capture and the second display capture;
      a first identifier identifying the first display capture and the second display capture as from the first instance in the application; and
      a second identifier identifying the third display capture and the fourth display capture as from the second instance in the application.

4. The computer-implemented method of claim 1, wherein the testing of the first emulated mobile device and the testing of the second emulated mobile device is automatic testing.

5. The computer-implemented method of claim 1, further comprising:
   determining the differences between the first display capture and the second display capture;
   creating an image of the determined differences; and
   transmitting the image of the determined differences to the display device.

6. The computer-implemented method of claim 5, wherein the image of the determined differences is further configured to cause a simultaneously display with the first display capture and the second display capture.

7. The computer-implemented method of claim 1, further comprising:
   receiving a third display capture from a testing of a third emulated mobile device executing the application, wherein the third display capture is from the first instance in the application; and
   packaging the third display capture into the display capture package, wherein the display capture package is further configured to cause a simultaneous display of the third display capture with the first display capture and the second display capture.

8. The computer-implemented method of claim 1, wherein an instance in the application is a number of display updates occurring on an emulated device executing the application.

9. The computer-implemented method of claim 1, further comprising:
   determining the differences between the first display capture and the second display capture by comparing corresponding pixels between the first display capture and the second display capture;
   creating an image of the determined differences; and
   transmitting the image of the determined differences to the display device.

10. The computer-implemented method of claim 9 wherein the differences are determined between two grayscale images corresponding the first display capture and the second display capture, and wherein the image of the determined differences is determined from the difference in grayscale pixel values.

11. The computer-implemented method of claim 1 further comprising:
   responsive to the first display capture and second display capture having different resolutions, preprocessing at least one of the first display capture and second display capture to have the same resolution;
   after said preprocessing, determining the differences between the first display capture and the second display capture;
   creating an image of the determined differences; and
   transmitting the image of the determined differences to the display device.

12. The method of claim 11 wherein said preprocessing comprises blurring whichever of the first display capture and second display capture has a higher resolution.

13. The computer-implemented method of claim 1, further comprising determining the differences between the first display capture and the second display capture by comparing the total pixel values of a mask between the first display capture and the second display capture to determine with a predetermined threshold.

14. The computer-implemented method of claim 1, further comprising determining the differences between the first display capture and the second display capture by comparing grayscale values or component values for pixel color.

15. A system, comprising:
   a receiver configured to receive:
      a first display capture from a testing of a first emulated device executing an application, wherein the first display capture is from a first instance in the application; and
      a second display capture from a testing of a second emulated device executing the application, wherein the second display capture is from the first instance in the application;
   a packager in communication with the receiver and configured to create a display capture package comprising the first display capture, the second display capture, and a formatting script configured to cause a simultaneous display the first display capture and the second display capture; and
   a transmitter couplable to the packager and configured to output the display capture package to a display device.

16. The system of claim 15, wherein the first emulated device and the second emulated device are mobile devices.

17. The system of claim 15, wherein:
   the receiver is further configured to receive:
      a third display capture from the testing of the first emulated mobile device executing the application, wherein the third display capture is from a second instance in the application;
      a fourth display capture from the testing of the second emulated mobile device executing the application, wherein the fourth display capture is from the second instance in the application;
   the packager is further configured to package the third display capture and the fourth display capture into the display capture package, wherein the display capture package is configured to cause a simultaneous display of the third display capture and the fourth display capture; and
   the display capture package is further configured to display:
      the third display capture and the fourth display capture simultaneously with the first display capture and the second display capture;
      a first identifier identifying the first display capture and the second display capture as from the first instance in the application; and
      a second identifier identifying the third display capture and the fourth display capture as from the second instance in the application.

18. The system of claim 15, wherein the testing of the first emulated mobile device and the testing of the second emulated mobile device is automatic testing.

19. The system of claim 15, further comprising:
   a comparator couplable to the receiver and configured to determine the differences between the first display capture and the second display capture; and
   an image creator couplable to the comparator and configured to create an image of the determined differences,
   wherein the transmitter is couplable to the image creator and further configured to output the image of the determined differences to the display device, wherein the display device is further configured to display the image of the determined differences.

20. The system of claim 19, wherein the image of determined differences is configured to cause a simultaneous display with the second display capture.

21. The system of claim 15, wherein:
   the receiver is further configured to receive a third display capture from a testing of a third emulated mobile device executing the application, wherein the third display capture is from the first instance in the application; and
   the packager is further configured to package the third display capture into the display capture package, wherein the display capture package is further configured to cause a simultaneous display of the third display capture with the first display capture and the second display capture.

22. The system of claim 15, wherein an instance in the application is a number of display updates occurring on an emulated device executing the application.

23. A non-transitory computer-readable medium on which is encoded program code, comprising:
   program code to receive a first display capture from a testing of a first emulated device executing an application, wherein the first display capture is from a first instance in the application;
   program code to receive a second display capture from a testing of a second emulated device executing the application, wherein the second display capture is from the first instance in the application;

program code to create a display capture package comprising the first display capture, the second display capture, and a formatting script configured to cause a simultaneous display of the first display capture and the second display capture; and program code to output the display capture package to the display device.

24. The computer-readable medium of claim 23, wherein the first emulated device and the second emulated device are mobile devices.

25. The computer-readable medium of claim 23, further comprising:

program code to receive a third display capture from the testing of the first emulated mobile device executing the application, wherein the third display capture is from a second instance in the application;

program code to receive a fourth display capture from the testing of the second emulated mobile device executing the application, wherein the fourth display capture is from the second instance in the application; and program code to package the third display capture and the fourth display capture into the display capture package, wherein the display capture package is further configured to display:

the third display capture and the fourth display capture simultaneously with the first display capture and the second display capture;

a first identifier identifying the first display capture and the second display capture as from the first instance in the application; and a second identifier identifying the third display capture and the fourth display capture as from the second instance in the application.

26. The computer-readable medium of claim 23, wherein the testing of the first emulated mobile device and the testing of the second emulated mobile device is automatic testing.

27. The computer-readable medium of claim 23, further comprising:

program code to determine the differences between the first display capture and the second display capture;

program code to create an image of the determined differences; and program code to output the image to the display device, wherein the display device is further configured to display the image of the determined differences.

28. The computer-readable medium of claim 23, wherein the display device is further configured to display the first display capture and the second display capture simultaneously with the image of the determined differences.

29. The computer-readable medium of claim 23, further comprising:

program code to receive a third display capture from a testing of a third emulated mobile device executing the application, wherein the third display capture is from the first instance in the application; and program code to package the third display capture into the display capture package, wherein the display device is further configured to display the third display capture simultaneously with the first display capture and the second display capture.

30. The computer-readable medium of claim 23, wherein an instance in the application is a number of display updates occurring on an emulated device executing the application.

* * * * *